United States Patent [19]

Artz et al.

[11] Patent Number: 4,525,226

[45] Date of Patent: Jun. 25, 1985

[54] HIGH YIELD NITROGEN GAS GENERATORS

[75] Inventors: Glen D. Artz, Canoga Park; Joseph E. Flanagan, Woodland Hills, both of Calif.

[73] Assignee: Rockwell International Corporation, El Segundo, Calif.

[21] Appl. No.: 421,927

[22] Filed: Sep. 23, 1982

Related U.S. Application Data

[63] Continuation-in-part of Ser. No. 244,191, Mar. 16, 1981, abandoned.

[51] Int. Cl.$^3$ .............................................. C06B 35/00
[52] U.S. Cl. ...................................... 149/35; 149/45; 149/61; 252/188.31; 252/350; 423/410
[58] Field of Search ............................ 252/188.31, 350; 423/410; 149/35, 45, 61

[56] References Cited

U.S. PATENT DOCUMENTS 3,755,182  8/1973  Marshall .......................... 149/35 X
3,931,040  1/1976  Breazeale ......................... 149/35 X

*Primary Examiner*—Stephen J. Lechert, Jr.
*Attorney, Agent, or Firm*—H. Fredrick Hamann; Harry B. Field

[57] ABSTRACT

A solid propellant gas generator for producing greater than 50-weight percent pure nitrogen gas comprising a stoichiometric blend of sodium azide, $NaN_3$, and sodium sulfate, $Na_2SO_4$, and ballistic modifiers.

2 Claims, 1 Drawing Figure

HIGH YIELD NITROGEN GAS GENERATORS

CROSS-REFERENCE TO RELATED APPLICATION

This application is a continuation-in-part of copending application Ser. No. 244,191, filed Mar. 16, 1981, now abandoned.

BACKGROUND OF THE INVENTION

1. Field of the Invention

This invention relates to gas generators and is particularly directed to solid propellant gas generators for producing high yields (>50% by weight) of pure nitrogen gas.

2. Description of the Prior Art

Previously developed gas generators for the production of nitrogen gas have employed sodium azide as the primary source of nitrogen in conjunction with a variety of solid oxidizers. Typical oxidizer examples are fluorocarbon polymers such as Viton A (U.S. Pat. No. 3,977,924), Teflon (U.S. Pat. No. 3,833,432), cupric oxide (German Pat. No. 2,327,741) and numerous others.

U.S. Pat. No. 3,947,300 describes a propellant system in which sodium azide is used with the inorganic oxidants (chlorates, nitrates, chromates, and peroxides) in conjunction with flux promoting compounds such as silicon dioxide. A typical example (5:1:2 molar ratio of $NaN_3:NaNO_3:SiO_2$) would result in a 42.2 weight percent yield of nitrogen at a temperature of 2050° K.

All of the previous work has resulted in nitrogen gas yields of 20 to 45 weight percent, and propellant physical properties which are marginal in that small pieces of the pressed grains erode upon vibration of the containing vessel. This often results in erratic pressurization rates upon ignition of the propellant change.

Utilization of flux promoting compounds such as $SiO_2$ also degrade physical properties, but also increase the flame temperature due to secondary chemical reactions such as:

$$Na_2O + SiO_2 \rightarrow Na_2SiO_3$$

The additional heat released from the secondary reactions must then be absorbed in a heat transfer media which adds to the complexity of the overall system.

SUMMARY OF THE INVENTION

Accordingly, there is provided by the present invention a solid propellant gas generator for producing pure nitrogen gas, which comprises a stoichiometric blend of sodium azide, sodium sulfate and ballistic modifiers such as sodium nitrite, sodium nitrate and mixtures thereof.

OBJECTS OF THE INVENTION

Therefore, it is an object of the present invention to produce pure nitrogen gas from a solid propellant gas generator.

Another object of the present invention is to provide a solid propellant gas generator for producing pure nitrogen which has good physical properties.

Yet another object of the present invention is to provide a solid propellant nitrogen gas generator containing sodium as its only metallic element.

Still a further object of the present invention is to produce a solid propellant nitrogen gas generator which yields greater than 50 weight percent pure nitrogen gas.

Yet another object of the present invention is to provide a solid propellant nitrogen gas generator having reduced flame temperature.

Other objects, advantages and novel features of the present invention will become apparent from the following detailed description of the invention.

DETAILED DESCRIPTION OF THE PREFERRED EMBODIMENTS

Figure 1:
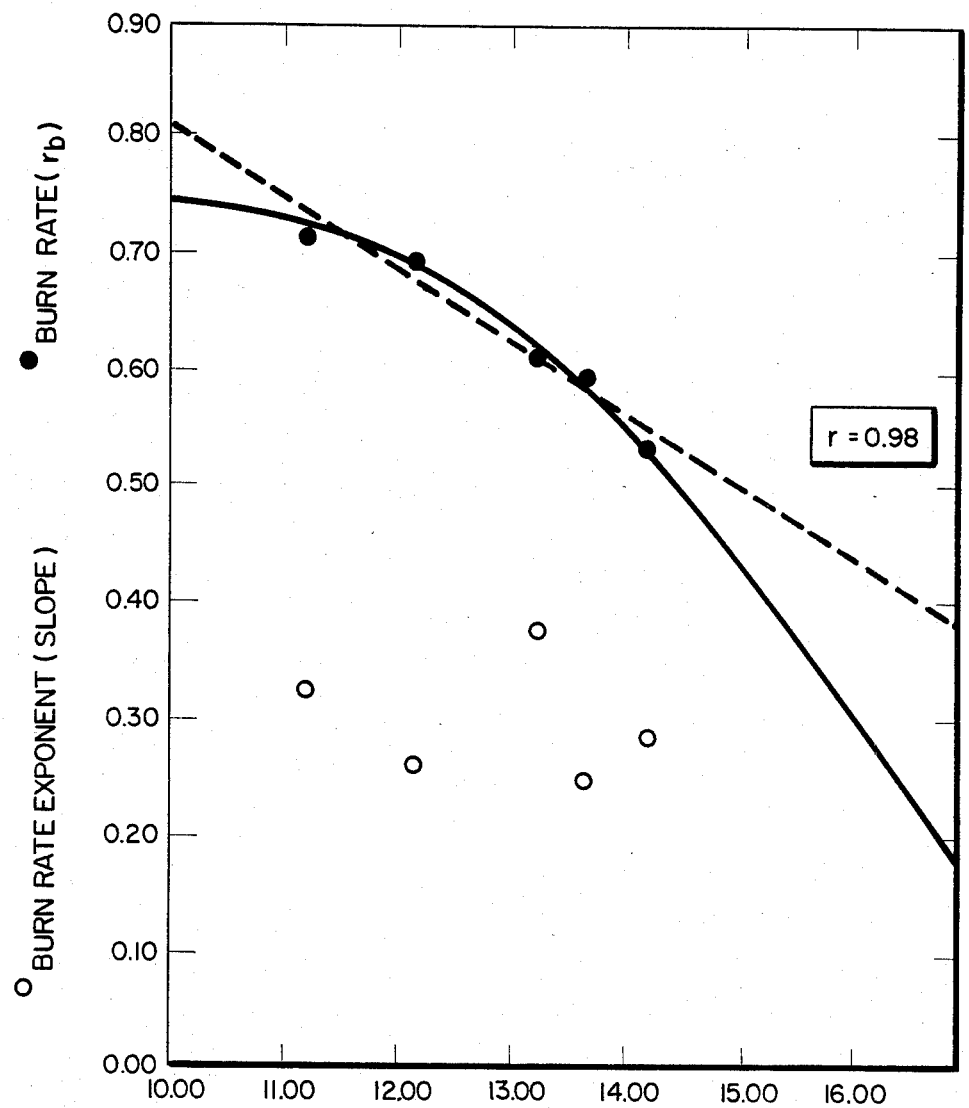
FIG. 1 is a graphical representation showing the correlation of burning rate exponent and burning rate to sodium sulfate in propellant formulation.

In accordance with the present invention, there is provided a solid propellant gas generator for producing pure nitrogen gas. The propellant comprises a stoichiometric blend of sodium azide ($NaN_3$) as the primary nitrogen source, and sodium sulfate ($Na_2SO_4$) as the oxidizing source. To this stoichiometric blend, ballistic modifiers selected from the group consisting of sodium nitrite ($NaNO_2$), sodium nitrate ($NaNO_3$) and mixtures thereof may be added. Thus, an overall chemical reaction for the present pure nitrogen gas generator can be described by the molar equation $$xNaNO_2 + yNaNO_3 + zNa_2SO_4 + (3x + 5y + 8z)NaN_3 \rightarrow$$

$$\underbrace{(2x + 3y + 4z)Na_2O + zNa_2S}_{\text{Solid Residue}} + \underbrace{(5x + 8y + 12z)N_2}_{\text{Gas}}$$

It must be noted that as shown in TABLE I and FIG. 1, the real key to producing pure nitrogen gas is the use of the sodium sulfate. As the sodium sulfate is replaced by either sodium nitrate and/or sodium nitrite, the combustion rate increases. Therefore, $NaNO_3$ and $NaNO_2$ would be ballistic modifiers.

FIG. 1 shows the correlation of burning rate ($r_b$) and burning rate exponent (slope) with weight percent composition for each component which was investigated. An excellent correlation (correlation coefficient $r=0.98$) between burning rate and w/o sodium sulfate was found. This relationship between $r_b$ and w/o sodium sulfate, which was inverse, could account for the previous observation that sodium sulfate is a major factor in controlling flame temperature. As can also be noted in TABLE I, when $z=0$ flame temperatures were 400°–500° K. higher than when $z=1$ or 2.

By way of example and not limitation, TABLE I illustrates the range of yields experimentally attained dependent upon the stoichiometry.

TABLE I

| GAS GENERATOR PERFORMANCE | | |
|---|---|---|
| Molar Ratios | Flame Temperature | Wt. % $N_2$ Yield |
| $x = 0; y = 0; z = 1$ | 1193° K. | 50.75 |
| $x = 1; y = 0; z = 0$ | 1643° K. | 54.02 |
| $x = 0; y = 1; z = 0$ | 1742° K. | 54.63 |
| $z = 0; y = 1; z = 2$ | 1275° K. | 51.71 |

It should be noted that although only four specific examples have been delineated, any quantities of ballistic modifiers can be used in combination with the $NaN_3$ and $Na_2SO_4$ in accordance with the overall equation described above.

The physical properties of propellants produced from any ratio of x:y:z ranged from about 14,000 psi to about 20,000 psi crush strength for a ½" by ½" cylinder. In contradistinction, propellants produced with materials such as $SiO_2$, $Fe_2O_3$, and Teflon present only possessed crush strengths in the range of 3,000 psi to 6,000 psi.

The nitrogen gas produced from the combustion of the propellants with varying ratios of x:y:z all was of 99.9% or higher purity.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A solid propellant gas generator for producing greater than 50-weight percent pure nitrogen gas comprising a stoichiometric blend of sodium azide, $NaN_3$, and sodium sulfate, $Na_2SO_4$, and ballistic modifiers.

2. The solid propellant gas generator of claim 1 wherein said ballistic modifiers are selected from the group consisting of $NaNO_3$, $NaNO_2$ and mixtures thereof.

* * * * *